United States Patent [19]

Kaneshi et al.

[11] Patent Number: 4,775,233
[45] Date of Patent: Oct. 4, 1988

[54] METHOD OF THE MEASUREMENT OF LIGHT FROM AN OPTICAL CABLE AND ARRANGEMENT THEREFOR

[75] Inventors: Masatoshi Kaneshi, Yokohama; Nobuhiro Sakakibara, Tokyo; Masahiko Fukuda, Tokyo; Tadashi Nakane, Tokyo, all of Japan

[73] Assignees: Sumitomo Electric Industries, Ltd., Osaka; Ando Electric Co., Ltd., Tokyo, both of Japan

[21] Appl. No.: 865,833

[22] Filed: May 22, 1986

[30] Foreign Application Priority Data

May 24, 1985 [JP] Japan .................... 60-111777
May 24, 1985 [JP] Japan .................... 60-111778
May 24, 1985 [JP] Japan ................ 60-077484[U]

[51] Int. Cl.⁴ ............ G01N 21/84; G01N 21/88; G02B 5/14
[52] U.S. Cl. .................... 356/73.1; 350/96.15
[58] Field of Search ............. 356/73.1; 350/96.15

[56] References Cited

U.S. PATENT DOCUMENTS 4,102,579  7/1978  Stewart ............... 356/73.1
4,557,550  12/1985  Beals et al. ........... 350/96.15

FOREIGN PATENT DOCUMENTS 58-198015  11/1983  Japan ................. 356/73.1

Primary Examiner—Vincent P. McGraw
Attorney, Agent, or Firm—Cushman, Darby & Cushman

[57] ABSTRACT

In a method of measurement of light from an optical fiber, the optical fiber is bent in a semi-spherical shape. A light dispersing member is attached to the bent portion of the optical fiber. The light from the bent portion is measured through the light dispersing member.

13 Claims, 3 Drawing Sheets 4,775,233

METHOD OF THE MEASUREMENT OF LIGHT FROM AN OPTICAL CABLE AND ARRANGEMENT THEREFOR

BACKGROUND OF THE INVENTION

1. Field of the Invention

The present invention relates to a method of the measurement of light from an optical cable.

2. Description of the Prior Art

When light is entered into an optical fiber cable, normally the light is entered from an end of the optical fiber cable. However, in case of connecting two optical fibers it is desired to enter light into the optical fibers at an intermediate position of the optical fibers. As shown in FIG. 1, in connecting two optical fibers 2 and 3, the respective ends 2A and 3A of two optical fibers 2 and 3 are coincided each other with respect to their optical axis, thereafter both ends 2A and 3A are melted and connected together. In coinciding the optical axis of the two optical fibers 2 and 3, light of a light source 1 is applied to the optical fiber 2, transferring the light in the optical fiber 2 to the optical fiber 3 through the ends 2A and 3A. Light intensity at the other end of the optical fiber 3 is measured by a light detector 4 and the adjustment of the optical axis of the optical fibers 2 and 3 is made in such a manner that the maximum output of the detector 5 can be obtained. However, the optical fiber is extended in a unit up to several tens kilometers. Thus, in connecting two optical fibers extending such a length, the above method shown in FIG. 1 is apparently inefficient since the light detector 4 is so far away from the light source 1. In order to make the adjustment of the axis of the optical fibers easy, there has been used a local light application method in which the light is applied in the optical fiber at the position near the end 2A of the optical fiber 2. In the conventional local light application method, the optical fiber 2 is bent in a round manner near the end 2A and the light is applied to the bent portion 2B from a light source 5 through an optical fiber 6 and a lump of matching oil 7 coated on the optical fiber 2.

In the arrangement of FIG. 2, light transmission efficiency varies at the end 6A of the optical fiber 6, the matching oil 7 and the bent portion 2B of the optical fiber 2, whereby the adjustment of the axis of the optical fibers 2 and 3 is troublesome. Also the work of coating the matching oil on the optical fiber 2 is necessary. In addition the optical fiber 2 is stained by the matching oil 7. Moreover, change of the light transmission efficiency decreases the efficiency of the light detection at the light detector 4.

SUMMARY OF THE INVENTION

An essential object of the present invention is to provide a method of the application of light to an optical fiber which improves the light detection efficiency in the local light application system in an optical fiber cable system.

Another object of the present invention is to provide a method of the detection of light of an optical fiber in which a local light application system is employed in which the light detection efficiency is improved.

A further object of the present invention is to provide an improved arrangement of application and/or detection of light into an optical fiber which can improve the detection and application efficiency.

According to the present invention, there is provided a method of application of light to an optical fiber comprising the steps of:

bending the optical fiber along a continuous smooth curvature, locating a light dispersing member along the bent portion of the optical fiber, and applying light into the bent portion of the optical fiber through the light dispersing member.

According to the present invention there is further provided a method of measurement of light from an optical fiber comprising the steps of:

bending the optical fiber along a continuous smooth curvature, applying light to the optical fiber at any one of position along the optical fiber, locating a light dispersing member along the bent portion of the optical fiber, and measuring light from the bent portion of the optical fiber through the light dispersing member.

According to the present invention there is further provided with an arrangement of measurement of light of an optical fiber which comprises a housing, a moving base movably mounted in the housing, a projection formed on the moving base for engagement of the intermediate portion of the optical fiber so as to form a bent portion of the optical fiber, and an optical processor containing at least any one of a light source and light detector for applying or receiving light at the bent portion of the optical fiber.

DETAILED DESCRIPTION OF THE PREFERRED EMBODIMENTS

Figure 1:
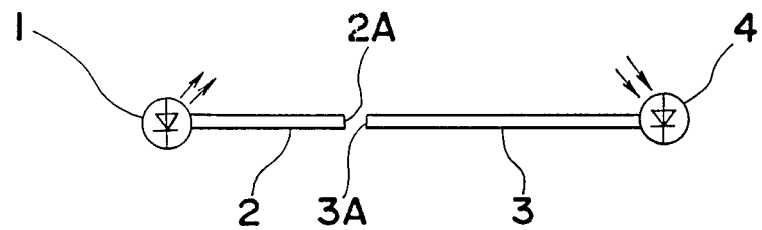
FIG. 1 is a schematic diagram showing an example of a way of adjusting the optical axis of two optical fibers.
Figure 2:
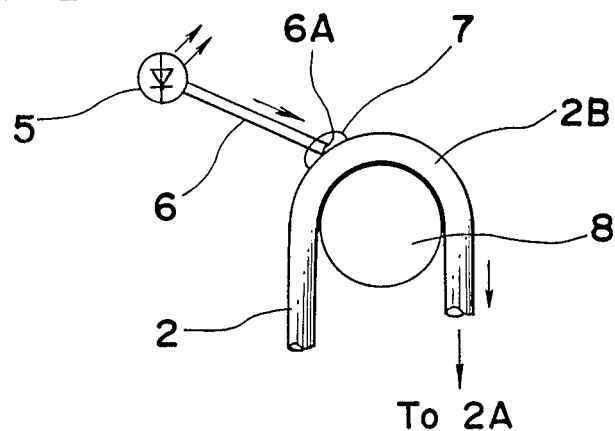
FIG. 2 is a schematic diagram showing one example of application of light in the local light application system

Before the description proceeds, it is noted that like parts are numbered by like reference numerals.

Figure 3:
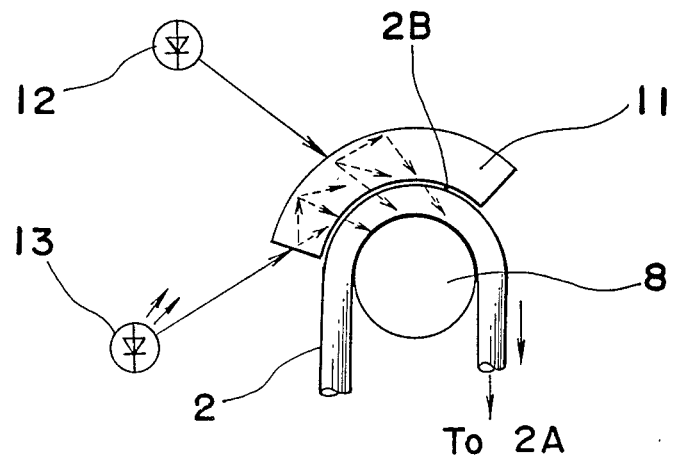
FIG. 3 is a side view showing an embodiment of a method of application of light to an optical fiber according to the present invention.

Referring to FIG. 3, the optical fiber 2 is smoothly bent around a round block 8 in a portion near the optical fiber 3 which is connected to the optical fiber 2 through the ends 2A and 3A. The shape of the bent portion of the optical fiber 2 may be selected as desired so far as the optical fiber can be bent smooth. The bent portion may be elliptical shape or parabolic shape.

The diameter of the round block 8 in a range of 6 mm to 8 mm is most suitable for facilitating application of light of the source 12 to the optical fiber 2 through the bent portion 2B.

A light dispersing member 11 is fitted on the optical fiber 2 along the bent portion 2B of the optical fiber 2 in a shape conforming to the curvature of the bent portion of the optical fiber 2. The light dispersing member 11 is made of materials such as acrylic resin, PVC tape, vinyl tape for dispersing light incident thereto. In case the light dispersing member 11 is formed in an arcuate concave shape so as to surround the bent portion 2B, light incident efficiency can be increased. As the light incident to the light dispersing member 11 can be dispersed in the three dimensional manner, the light application efficiency can be improved. A light source 12 is provided for applying the light to the light dispersing member 11 generally in a radial direction. Another light source is provided for applying the light to the light dispersing member 11 for applying generally along the circumferential direction of the light dispersing member 11. In the embodiment mentioned above, two light sources 12 and 13 are provided for increasing amount of light incident to the light dispersing member 11 to facilitate measurement of light by the detector 4, the number of the light source may be selected as desired. The light from the light sources 12 and 13 are applied to the light dispersing member 11 without using matching oil or the like, then applied to the optical fiber 2.

Figure 4:
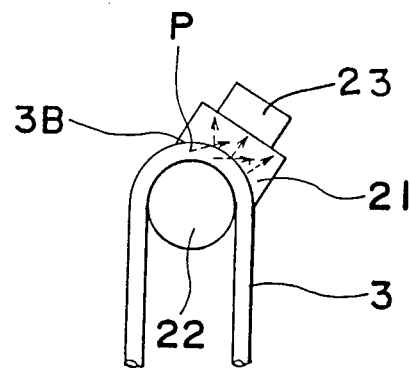
FIG. 4 is a plan view showing an embodiment of a light receiving portion according to the present invention.

On the other hand, a further light dispersing member 21 is fitted on the optical fiber 3 as shown in FIG. 4 at a position where the optical fiber 3 is bent round along the block 22 similar to the arrangement employed in FIG. 3. A light detector 23 is fitted to the light dispersing member 21 to receive the light dispersed by the light dispersing member 21.

In the arrangement shown in FIGS. 3 and 4, when the light is applied to the light dispersing member 11, the light is applied in the optical fiber 2 from the light dispersing member 11 and the incident light is transmitted to the optical fiber 3 through the connected surfaces 2A and 3A, reaching the light dispersing member 21. The light is applied to the light dispersing member 21 and is detected by the light detector 23.

The light incident to the light detector 23 is greatest when the light detector 23 is disposed away from the center C of the bent portion 3B of the optical fiber 3 by 30°.

By the method mentioned above, since the light to or from the optical fiber is passed the light dispersing member, the light from the bent portion of the optical fiber can be collected through the contact portion between the optical fiber and the light dispersing member, the light can be applied to or received from the optical fiber with a high efficiency. Thus the local optical application or local measurement can be performed with a high efficiency.

Also as there is no need to fit matching oil onto the optical fiber, the optical fiber can be prevented from being stained.

Figure 5:
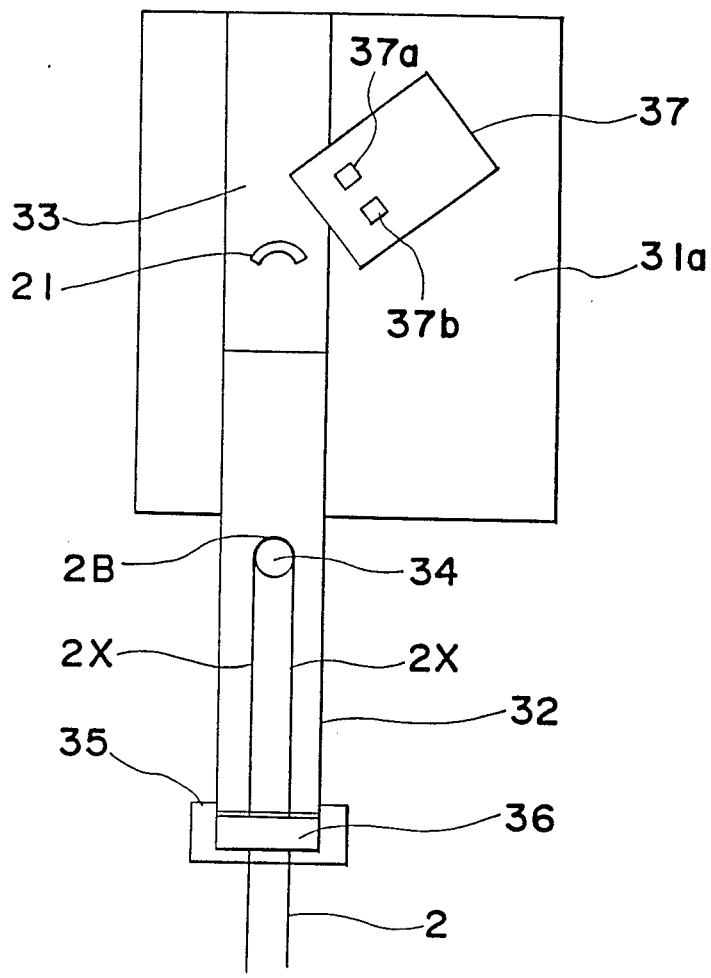
FIG. 5 is a side view showing an embodiment of an arrangement of application of light to the optical fiber according to the present invention.
Figure 6:
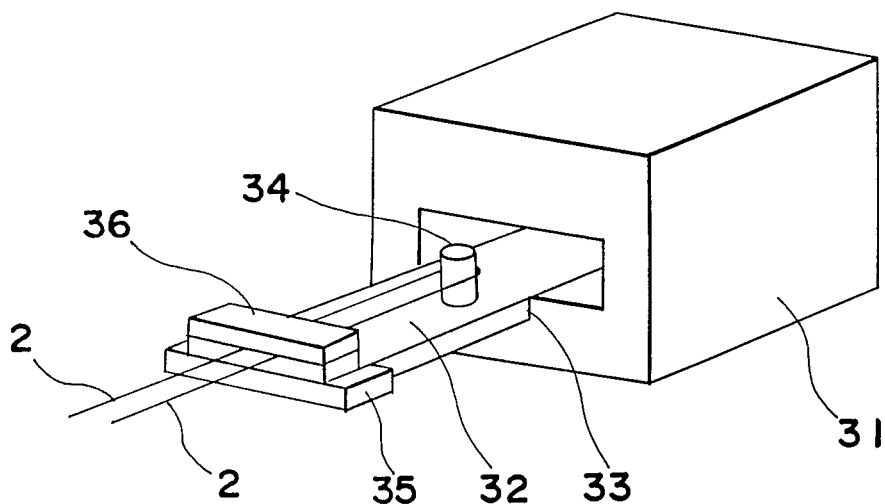
FIG. 6 is a perspective view of the arrangement show in FIG. 5.
Figure 7:
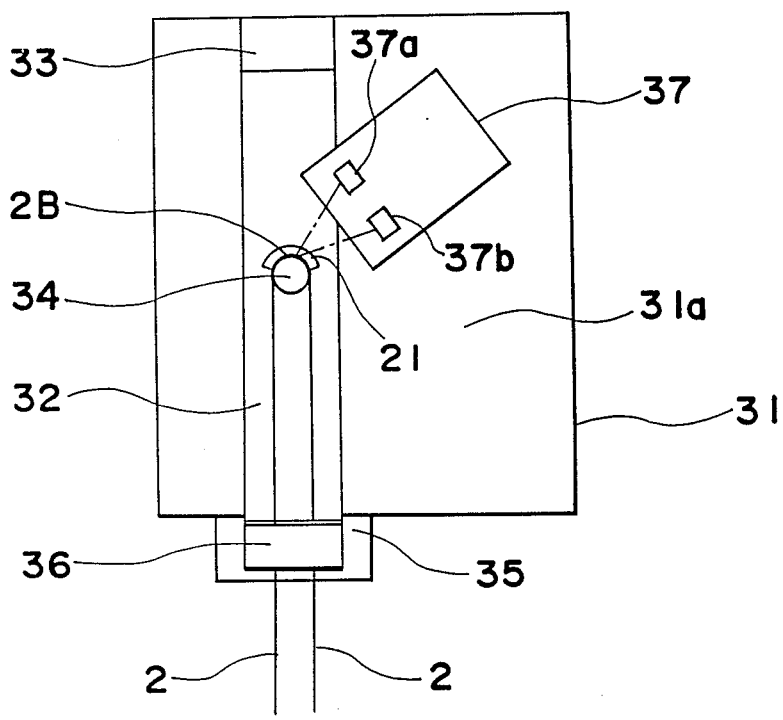
FIG. 7 is a plan view of the arrangement of application of light to an optical fiber shown in FIG. 5 in which the optical fiber is drawn toward the light source.

Referring to FIGS. 5 to 7, in a housing 31 generally having a cubic shape, a moving base 32 of a straight elongated plate is slidably fitted in a straight guide slot 33 defined on a bottom wall 31a of the housing 31.

A block 34 having a round shape similar to the blocks 8 and 22 is projected at an intermediate position of the moving base 32. The optical fibers 2 and 3 connected together in one string is wound on the block 34. A stopper 35 is secured to the external end of the moving base 32 so as to limit the movement of the moving base when the moving base 32 is fully retracted in the housing 31. An optical fiber anchor 36 is detachably secured on the moving base 32 to fix the optical fibers 2 in position by pressing the fiber from above.

An optical processing device 37 containing a light source 37a and a light detector 37b is disposed on the bottom wall of the housing so as to apply the light to the bent portion 2B or to receive the light from the bent portion of the optical fiber 2 when the moving base 32 is suitably retracted in the housing so that the light source 37a or light detector 37b accesses the optical fiber 2.

The light dispersing member 21 is disposed at a predetermined position so that the optical fiber wound around the block 34 is able to contact with the light dispersing member 21 when the moving base 32 is moved and the block comes near the optical processing device 37.

In the arrangement described above, when the device is used as the light application device, the light source 37a is turned on to apply the light to the optical fiber 2. The optical fiber 2 is engaged around the block 34 by a half turn so that the optical fiber 2 is projected toward the optical processing device 37 with the straight portions 2x parallely stretched between the block 34 and the fiber anchor 36 and the optical fiber 2 is fixed on the moving base 32 by the fiber anchor 36. Then the moving base 32 is moved toward the optical processing device 37. When the stopper 35 abuts the edge of the bottom wall 31a, the moving base 31 is stopped and the bent portion 2B of the optical fiber 2 reaches near the light source 37a contacting with the light dispersing member 21. The position of the bent portion 2B of the optical fiber 2 around the block 34 is placed in such a position that the light from the light source 37a can be applied to the optical fiber 2 with the highest efficiency when the stopper 32 abuts the edge of the bottom wall 31a. Thus, the light from the light source 37a can be applied to the optical fiber 2 through the light dispersing member 21 and the bent portion 2B. The light transmitted through the optical fiber 2 can be measured at a suitable place such as the end of the optical fiber 2 by a light detector not shown.

When the device is used as the light measurement device, the light source 37a is turned off and the light detector 37b is enabled. Light is applied into the optical fiber 2 at a suitable position such as an end of the optical fiber 2 and the light passing through the optical fiber 2 is projected to the light detector 37b from the bent portion 2B through the light dispersing member 21 and the amount of light projected from the bent portion 2B can be measured by the light detector 37B. In this case also it is so defined that the position of the bent portion 2B of the optical fiber 2 around the block 34 is placed in such a position that the light from the bent portion 2B of the optical fiber 2 source 37a can be applied to the light detector 37b with the highest efficiency when the stopper 32 abuts the edge of the bottom wall 31a.

The light source 37a and light detector 37b are provided with the light dispersing member 21 shown in FIG. 3 on the respective light emitting surface of the light source 37a and the light receiving surface of the light detector 37b for obtaining the same effect as mentioned in the embodiments shown in FIGS. 3 and 4.

According to the device shown in FIGS. 5 to 7, as the optical fiber wound around the block 34 is to a suitable position to perform the local light detection, by only moving the base 32, it is easy to locate the measuring point of the optical fiber at the most suitable position.

Also a number of the optical fibers can be tested with a high efficiency and under a uniform condition.

What is claimed is:

1. A method of application of light to an optical fiber comprising the steps of:
   bending the optical fiber along a continuous smooth curvature,
   locating a light dispersing member, made of material similar to or the same as the cover material of the optical fiber, along the bent portion of the optical fiber, and
   applying light into the bent portion of the optical fiber through the light dispersing member.

2. The method of application of light to an optical fiber according to claim 1, wherein said optical fiber is bent in a semi-circular round shape.

3. The method of application of light to an optical fiber according to claim 1, wherein said optical fiber is bent around a cylindrical member.

4. The method of application of light to an optical fiber according to claim 2, wherein said light is applied to the bent portion of the optical fiber at a position displaced from the most projected portion of the semi-circular shape.

5. A method of measurement of light from an optical fiber comprising the steps of:
   bending the optical fiber along a continuous smooth curvature,
   applying light to the optical fiber at any position along the optical fiber,
   locating a light dispersing member along the bent portion of the optical fiber, and
   measuring light from the bent portion of the optical fiber through the light dispersing member.

6. The method of measuring light from an optical fiber according to claim 5, wherein said optical fiber is bent in a semi-circular round shape.

7. The method of measuring light from an optical fiber according to claim 5, wherein said optical fiber is bent around a cylindrical member.

8. The method of measuring light from an optical fiber according to claim 6, wherein said light from the bent portion of the optical fiber is measured at a position displaced from the most projected portion of the semi-circular shape.

9. The method of measuring light from an optical fiber according to claim 5, wherein the optical fiber is formed by two optical fibers connected together and the connected portion is located in the bent portion.

10. The method of measuring light from an optical fiber according to claim 8, wherein said light is measured at a position along one of the optical fibers near the connected portion of the two optical fibers.

11. A method of measurement of light from an optical fiber as in claim 5, wherein said locating step comprises the step of locating along the bent position of the optical fiber a light dispersing member made of material similar to or the same as the cover material of the optical fiber.

12. An arrangement of measurement of light of an optical fiber comprising:
   a housing,
   a movable base mounted in the housing,
   a projection formed on said movable base for engagement of the intermediate portion of the optical fiber so as to form a bent portion of the optical fiber,
   an optical processor containing at least any one of a light source and light detector for applying or receiving light at the bent portion of the optical fiber, and
   a light dispersing member located in the light path of said optical processor.

13. An arrangement of measurement of light of an optical fiber comprising:
   a housing,
   a movable base mounted in the housing,
   a projection formed on said movable base for engagement of the intermediate portion of the optical fiber so as to form a bent portion of the optical fiber,
   an optical processor containing at least any one of a light source and light detector for applying or receiving light at the bent portion of the optical fiber, and
   a light dispersing member located in the light path of said optical processor, wherein said light dispersing member is made of a material similar to or the same as the cover material of the optical fiber.

* * * * *